(12) United States Patent
Simoneau et al.

(10) Patent No.: US 10,695,154 B2
(45) Date of Patent: Jun. 30, 2020

(54) MOBILE UNIT FOR ANIMAL OVARIAN TISSUE PROCESSING

(71) Applicant: CLINIQUE VÉTÉRINAIRE CENTRE DU QUÉBEC INC., Notre-Dame-du-Bon-Conseil (CA)

(72) Inventors: Line Simoneau, Ste-Brigitte-des-Saults (CA); Jean-Yves Perreault, Notre-Dame-du-Bon-Conseil (CA); Jonathan Lehouiller, Drummondville (CA); Jean Hebert, Drummondville (CA); Louis Mills, Notre-Dame-du-Bon-Conseil (CA); Nicole Ruest, Saint-Majorique-de-Grantham (CA); Raynald Dupras, Saint-Liboire (CA); Roxane Remillard, Saint-Simon (CA)

(73) Assignee: CLINIQUE VETERINAIRE DU QUEBEC INC., Notre-Dame-du-Bon-Conseil, QC (CA)

( * ) Notice: Subject to any disclaimer, the term of this patent is extended or adjusted under 35 U.S.C. 154(b) by 449 days.

(21) Appl. No.: 15/672,665

(22) Filed: Aug. 9, 2017

(65) Prior Publication Data
US 2019/0046310 A1 Feb. 14, 2019

(51) Int. Cl.
*A61D 3/00* (2006.01)
*B60P 3/04* (2006.01)

(52) U.S. Cl.
CPC . *A61D 3/00* (2013.01); *B60P 3/04* (2013.01)

(58) Field of Classification Search
CPC ..... B60P 3/04; B60P 3/14; A61D 3/00; A61D 2003/003
(Continued)

(56) References Cited

U.S. PATENT DOCUMENTS

| 4,178,936 A | 12/1979 | Newcomb |
| 4,530,538 A * | 7/1985 | Greene, Jr. ............... B60P 3/04 119/412 |

(Continued)

FOREIGN PATENT DOCUMENTS

| GB | 2043450 A | 10/1980 |
| JP | S6456048 A | 3/1989 |

*Primary Examiner* — Jason S Morrow
(74) *Attorney, Agent, or Firm* — Norton Rose Fulbright Canada LLP

(57) ABSTRACT

A mobile unit for animal ovarian tissue processing comprises an enclosure supported on a wheeled chassis. A collecting chamber defined within the enclosure comprises a restraint mounted to the enclosure and configured to restrain an animal in a standing position, at least one access sized to provide the animal ingress to, and egress from, the collecting chamber, an ovum aspiration system disposed in the collecting chamber to retrieve oocytes from the animal and an imaging scanner disposed in the collecting chamber to guide the ovum aspiration system to the oocytes. A processing chamber defined within the enclosure contiguous to the collecting chamber is isolated from the collecting chamber by at least one dividing wall extending between the collecting chamber and the processing chamber. The processing chamber includes an incubator to incubate the oocytes. A temperature control unit maintains a temperature of the retrieved oocytes between a predetermined temperature range.

25 Claims, 9 Drawing Sheets

(58) Field of Classification Search
USPC .............................. 296/24.31, 24.38, 24.32
See application file for complete search history.

(56) References Cited

U.S. PATENT DOCUMENTS

| | | | |
|---|---|---|---|
| 5,924,385 A | 7/1999 | Cossel | |
| 6,336,426 B1 | 1/2002 | Kleinsasser | |
| 6,425,347 B1 | 7/2002 | Bogner et al. | |
| 6,609,477 B1 | 8/2003 | White | |
| 6,886,494 B2 | 5/2005 | Labrecque et al. | |
| 7,628,436 B1 * | 12/2009 | Cutler | B60P 3/04 |
| | | | 119/412 |
| 8,443,759 B2 | 5/2013 | Nagely | |
| 9,132,762 B1 * | 9/2015 | Heath | B60P 3/04 |
| 2001/0027752 A1 * | 10/2001 | Kleinsasser | A61D 3/00 |
| | | | 119/453 |
| 2012/0060764 A1 * | 3/2012 | Nagely | A01K 1/0035 |
| | | | 119/416 |

\* cited by examiner

FIG_2

MOBILE UNIT FOR ANIMAL OVARIAN TISSUE PROCESSING

TECHNICAL FIELD

The application relates generally to animal ovum retrieval and, more particularly, to a mobile unit suited for bovine ovum retrieval.

BACKGROUND OF THE ART

The production of in vitro bovine embryos using transvaginally collected oocytes generally requires a large number of oocytes retrieval. The oocytes are then prepared for maturation and subsequently for fertilization. Typically, the animal is transported to a collection center to retrieve the oocytes from the animal. Subsequently, the oocytes can be sent to a laboratory for their processing. The transportation journey can cause stress to the animal, long absence of the animal from its environment and temperature and dietary changes to the animal. These direct impacts can cause economical losses, such as a loss of milk productivity during the absence of the animal.

There are also several factors that can affect the success of the in vitro production of embryos, such as the medium used to transport the oocytes to the fertilization laboratory, the transportation time and the temperature changes of the medium. Biosecurity is also a concern where the animal can be put in contact with other animals from different farms, whose vaccination and immune status may be different, during the retrieval process.

SUMMARY

In one aspect, there is provided a mobile unit for animal ovarian tissue processing, the mobile unit comprising: an enclosure supported on at least one wheeled chassis; a collecting chamber defined within the enclosure, the collecting chamber comprising: a restraint mounted to the enclosure and configured to restrain and hold an animal in a standing position; at least one access sized to provide the animal ingress to, and egress from, the collecting chamber; an ovum aspiration system disposed in the collecting chamber to retrieve oocytes from the animal; and an imaging scanner disposed in the collecting chamber to guide the ovum aspiration system to the oocytes; a processing chamber separate from the collecting chamber, the processing chamber including an incubator to incubate the oocytes; and a temperature control unit operable in at least a heating setting to maintain a temperature of the retrieved oocytes between a predetermined temperature range.

In accordance with another aspect, there is provided a mobile unit for animal ovum pick up, the mobile unit comprising: a wheeled chassis including an enclosure for on-site collection; the enclosure compartmentalized into at least a collecting chamber and a processing chamber; the collecting chamber having at least one access to permit ingress and egress of an animal and equipped with a restraint configured to restrain and hold the animal in a standing position within the collecting chamber, a vacuum pump disposed in the collecting chamber to retrieve oocytes from the animal, an imaging scanner disposed in the collecting chamber to guide a veterinarian during the oocyte aspiration procedure, and a system for adjusting a suction flow of the vacuum pump; the processing chamber equipped with an incubator to incubate the oocytes retrieved in the collecting chamber; and a temperature control unit operable to maintain a temperature of the retrieved oocytes between a predetermined temperature range.

In accordance with a still further general aspect, there is provided a mobile unit for animal ovum pick up, the mobile unit comprising: a wheeled chassis including an enclosure defining a collecting chamber having at least one access to permit ingress and egress of an animal, the collecting chamber equipped with a restraint configured to restrain and hold the animal in a standing position within the collecting chamber, an ovum aspiration system disposed in the collecting chamber to retrieve oocytes from the animal, an imaging scanner disposed in the collecting chamber to guide the ovum aspiration system to the oocytes, a processing chamber equipped with an incubator to incubate the oocytes retrieved in the collecting chamber; and a temperature control unit operable to maintain a temperature of the retrieved oocytes between a predetermined temperature range.

DESCRIPTION OF THE DRAWINGS

Reference is now made to the accompanying figures in which.

DETAILED DESCRIPTION

Figure 1:
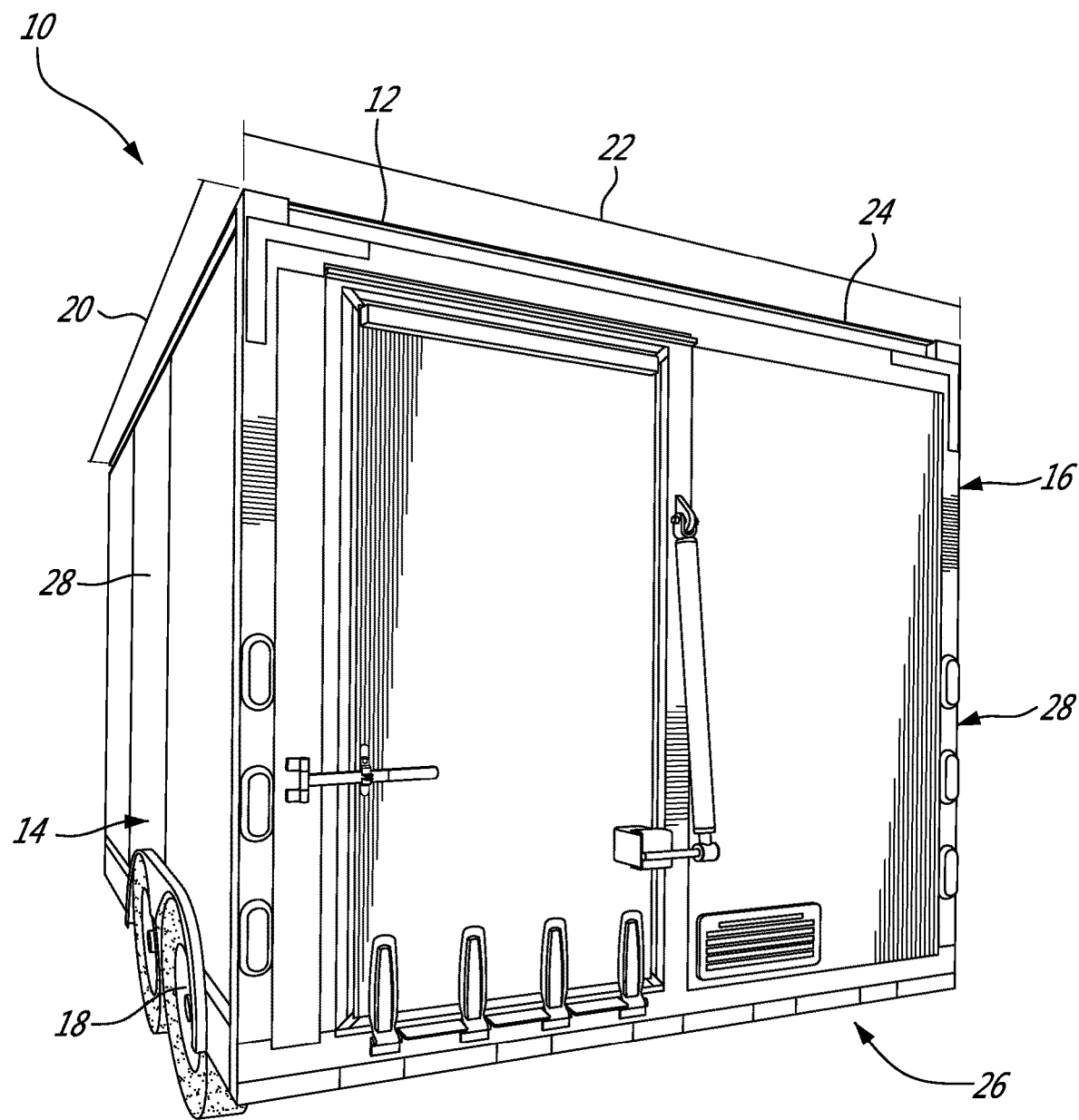
FIG. 1 is a rear perspective view of a mobile unit for animal ovarian tissue processing.

FIG. 1 illustrates a mobile unit 10 for in situ animal ovarian tissue processing. The ovarian tissue processing includes transvaginally collecting oocytes from an animal, such as a bovine or a cow, and processing the oocytes in an incubator to enable fertilization of the oocytes outside of the body of the animal. In this description, the term "oocyte" can be used interchangeably, when appropriate, with other terms such as "ovum". In a particular embodiment, the mobile unit 10 is designed as a mobile laboratory within which the oocytes from the animals can be collected and first interventions and/or time-sensitive procedures at the level of the oocytes can be carried out for their subsequent fertilization. For example, incubation of the oocytes can include time sensitive preparation procedures. The mobile unit 10 can enable the tissue processing interventions to be carried out at a habitat of the animal. The term "habitat" can also refer to a natural location of where the animal normally lives, such as a farm.

The mobile unit 10 includes an enclosure 12 for retrieving the oocytes from the animal and processing the oocytes for incubation. The animal is received in a collecting chamber 14 and the oocytes are processed in a processing chamber 16. The enclosure 12 is supported on a wheeled chassis 18 for facilitating the transportation of the chambers 14 and 16.

In the embodiment shown, the enclosure 12 is shown as a trailer attached to a vehicle. In other embodiments, other suitable movable enclosures can be used, such as enclosures configured similar to "camper trailers" or "house trailers". In a particular embodiment, the mobile unit 10 is designed to travel on a roadway network to reach the habitat or a destination where the animal is housed. The roadway network can include highways and streets of a city and can thus impose restrictions on a length 20 and width 22 of the mobile unit 10. In the embodiment shown, the enclosure has a width of 7½ feet. In another embodiment, the width 22 of the enclosure is 8 feet. The width 22 can be less than 7½ feet or any other suitable width and length to comply with local rules of the road and regulations. The enclosure 12 is enclosed by a ceiling 24, a floor 26 and sidewalls 28. These sidewalls 28 together with the ceiling 24 and the floor 26 provide protection from the surrounding elements, such as wind, rain, light, external temperature and the like. In a particular embodiment, the sidewalls 28, the ceiling 24 and the floor 26 are free from transparent or light-penetration sections to assist in providing a dark interior of the enclosure 12.

Figure 2:
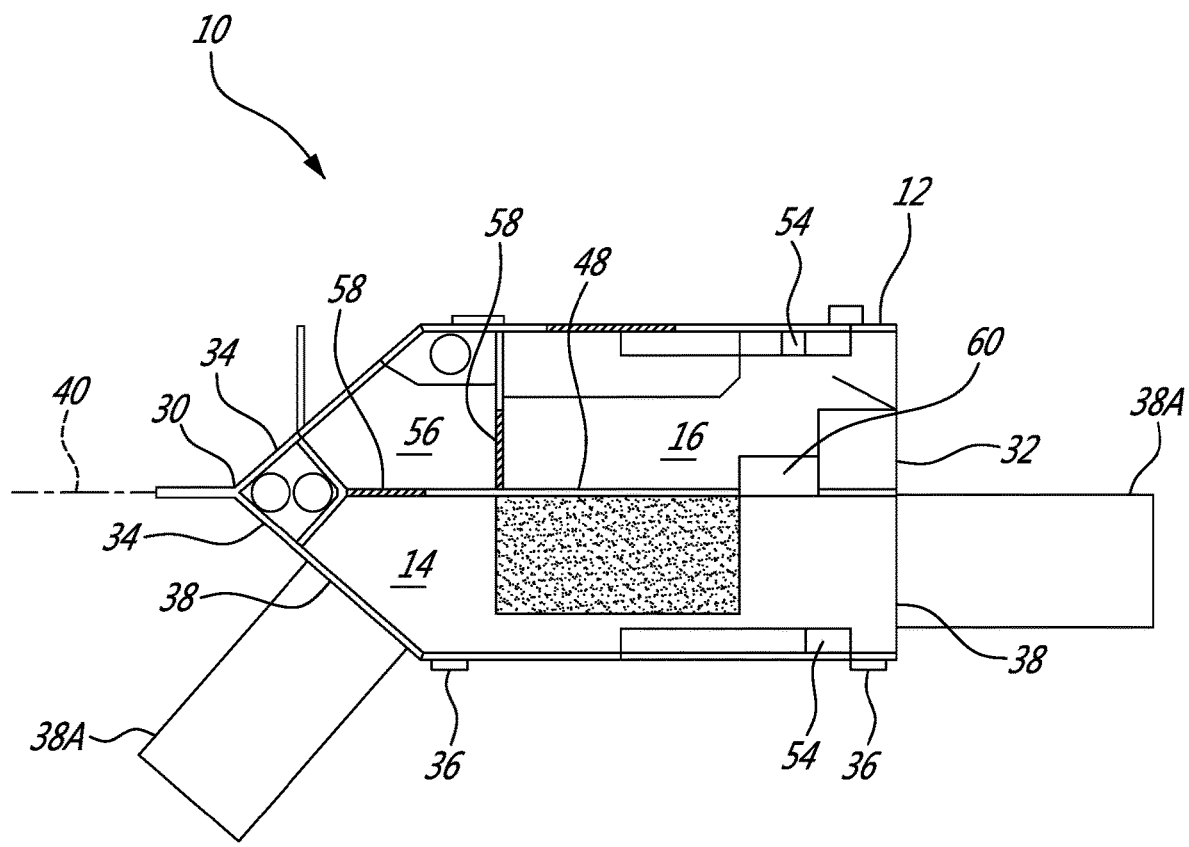
FIG. 2 is a schematic top cross-sectional view of an enclosure of the mobile unit.

FIG. 2 is a schematic cross-sectional top view of the mobile unit 10. The enclosure 12 extends between a front end 30 and a rear end 32. In the embodiment shown, the front end 30 is formed by two adjacent corner walls 34 connected together at an angle. Movable stabilizers 36 can be mounted to the chassis 18 of the mobile unit 10 to stabilize the chassis 18 relative to a ground surface. The ground surface can be the surface on which the mobile unit 10 is positioned. In operation, the movable stabilizers 36 engage the ground to level the mobile unit 10 and/or reduce tilting the mobile unit 10. The mobile unit 10 can tilt for example when the animal moves causing a shift in weight inside the mobile unit 10.

In the embodiment shown, the collecting and processing chambers 14, 16 are supported on the same wheeled chassis 18. In a particular embodiment, the collecting chamber 14 is supported on a first wheeled chassis and the processing chamber 16 is supported on a second wheeled chassis. The two wheeled chassis can be connected together in tandem or each chassis can be provided with its own motor vehicle. The two vehicles can then travel together to the habitats or the destinations of the animals for the in situ ovarian tissue processing.

The collecting chamber 14 is defined within the enclosure 12 and can extend from the rear end 32 to front end 30 of the enclosure 12. The collecting chamber 14 can include one or more doorways or accesses 38 to provide the animal ingress to and egress from the collecting chamber 14. In a particular embodiment, a hydraulic door 38A (FIG. 1) is mounted to the doorway or access 38 to control access of the animal into or out from the collecting chamber 14 by opening or closing the hydraulic door 38A. The hydraulic door 38a can be pivotable from a raised position closing access to the chamber to a lowered position in which the door 38a acts as a ramp to facilitate ingress and egress. Anti-slip features may be provided on the ramp. In the embodiment shown, a rear doorway or access is provided at the rear end 32 of the enclosure 12 and a front doorway or access is provided at the front end 30 of the enclosure 12. Each access has its respective door/ramp. The front doorway is defined in one of the corner walls 34 at an angle relative to a longitudinal axis 40 of the enclosure 12. This angular position provides a passageway exiting the collecting chamber 14 away from the motor vehicle. In use, the animal can enter the collecting chamber 14 from the rear doorway and exit the collecting chamber 14 from the front doorway.

Figure 3:
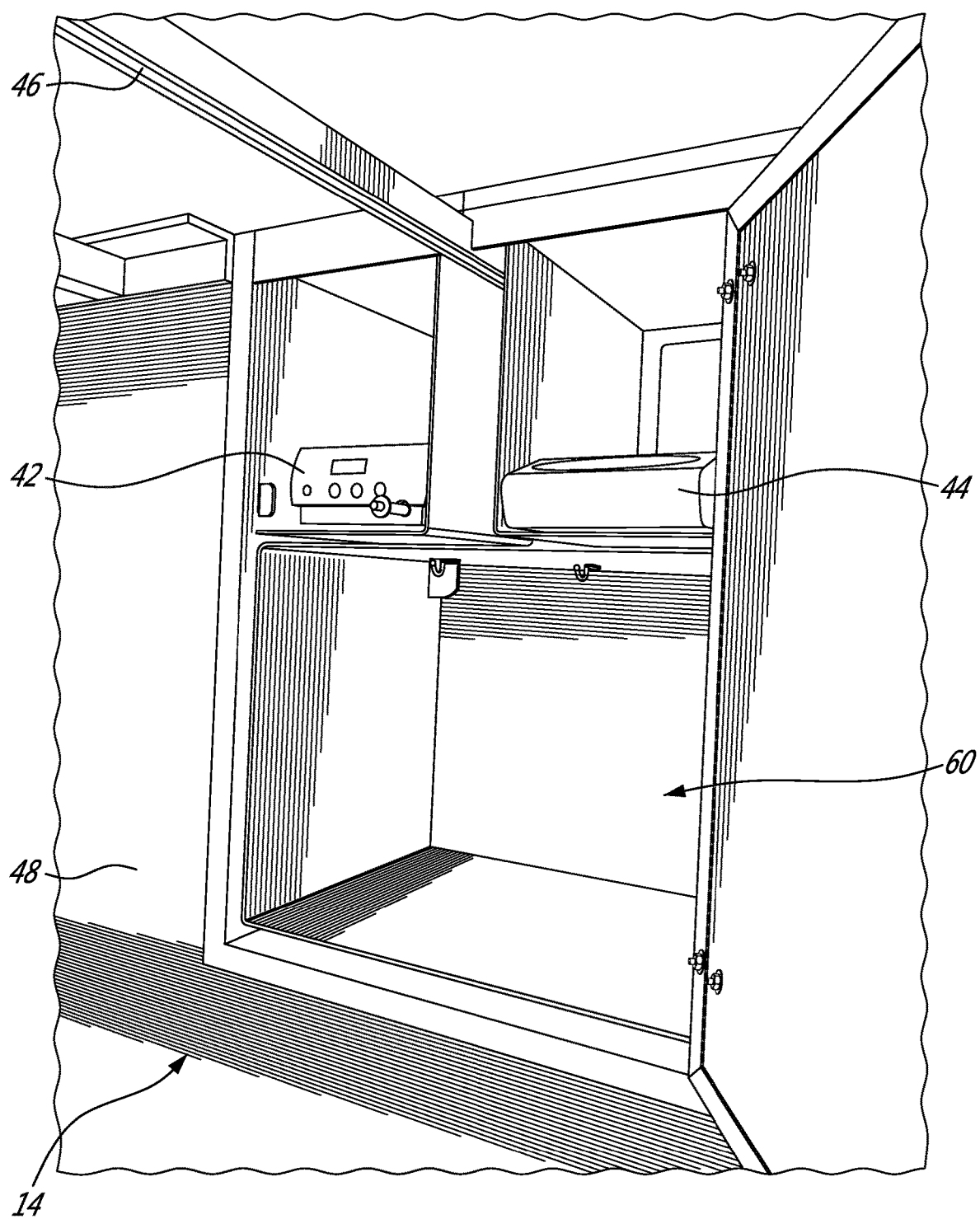
FIG. 3 is a partial perspective view of a collecting chamber defined in the enclosure.

The collecting chamber 14 is configured to receive the animal therein for the retrieval of the oocytes from the animal by a veterinarian or a qualified technician. Referring to FIG. 3, according to a particular embodiment, an ovum aspiration system 42 is disposed in the collecting chamber 14 to retrieve the oocytes from the animal. The aspiration system 42 provides a regulated suction flow. The aspiration system 42 can have a suction needle connected to a pump through a pipe or a vacuum line. The suction flow can have a regulated vacuum up to −500 mmHg. In a particular embodiment, the aspiration system 42 is a Cook Aspiration Unit™ from Cook Medical™. The flow rate of the aspiration flow can be adjusted by changing a relative height between a section of the pipe and the pump, skin friction resistance in the pipe, a temperature of flushing fluid and/or suction fluid and a length of the pipe. The suction flow rate of the aspiration system 42 can be controlled to a range between 10 and 20 millilitres per minute of suction fluid. In a particular embodiment, the suction flow rate is 15 millilitres per minute. The retrieved oocytes can be collected in a test tube. A test tube heater can be provided to maintain an adequate temperature of the oocytes in the test tube during manipulations of the test tube, such as for example during transportation of the oocytes in the test tube from one location to another. An imaging scanner 44 can also be disposed in the collecting chamber 14 to guide the ovum aspiration system 42 to the oocytes. The imaging scanner 44 can be an ultrasound scanner. The imaging scanner 44 can be used to collect data related to the size, shape and location of the follicles containing the oocytes. A rail 46 can be mounted on the ceiling 24 to support the imaging scanner 44, or any other device, and to displace the imaging scanner 44 from one side of the collecting chamber 14 to the other side of the chamber 14. The rail 46 can facilitate the displacement of the imaging scanner 44 within the collecting chamber 14 to adjust the location of the imaging scanner 44 depending if the technician is left-handed or right-handed. For example, if the technician is left-handed, e.g. using the left hand to collect the oocytes, the imaging scanner 44 can be moved to the right side of the technician.

According to the illustrated embodiment, the processing chamber 16 is defined with the enclosure 12. In the embodiment shown, the processing chamber 16 is contiguous to the collecting chamber 14. A dividing wall 48 extending between the processing chamber 16 and the collecting chamber 14 isolates the processing chamber 16 from the collecting chamber 14.

Figure 4:
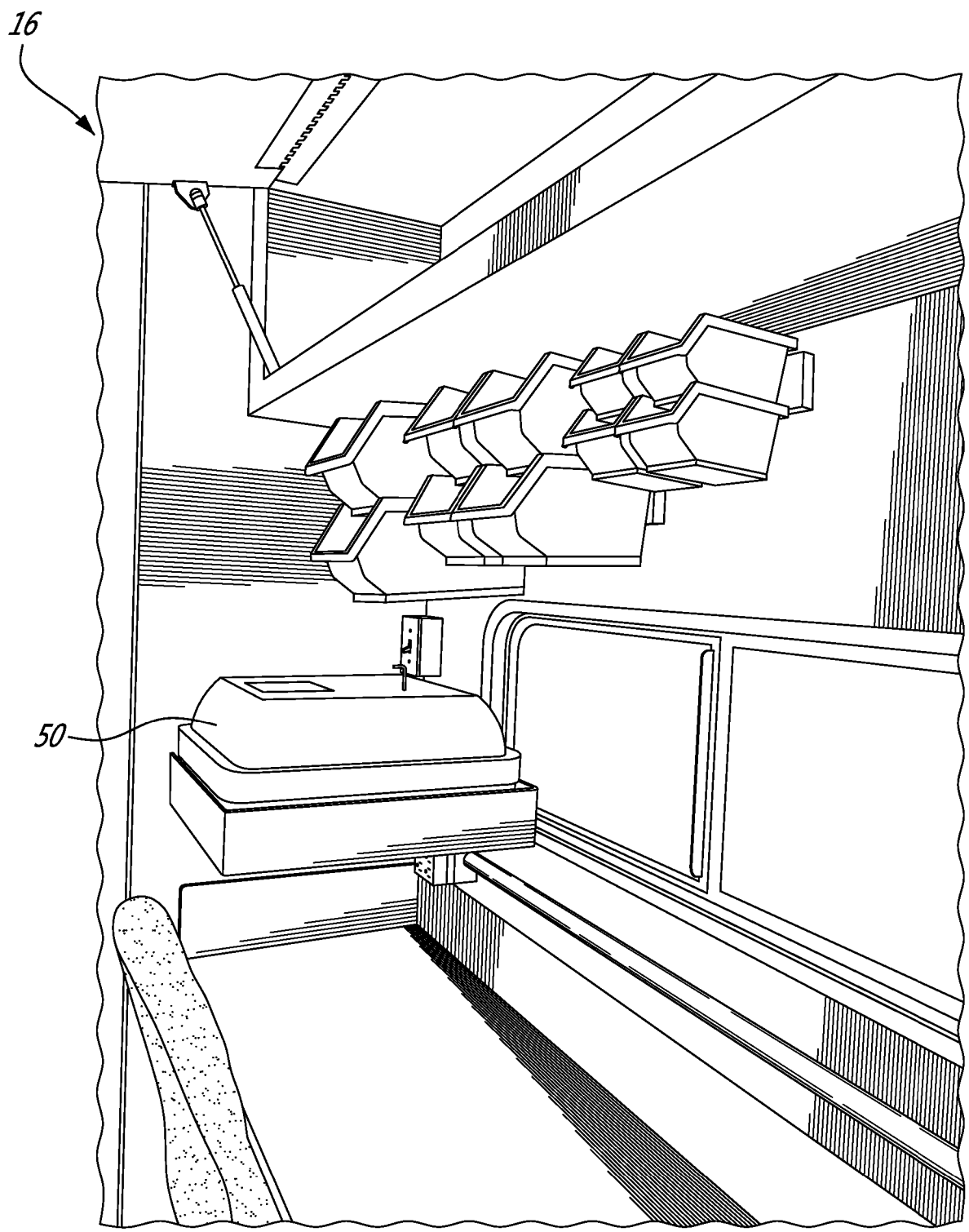
FIG. 4 is a partial perspective view of a processing chamber defined in the enclosure.

The processing chamber 16 is configured to allow the technician to process the oocytes and to conduct any time-sensitive interventions for the fertilization and/or incubation of the oocytes. Referring to FIG. 4, at least one incubator 50 is disposed in the processing chamber 16 to incubate the oocytes, for example, during stages of the maturation that are normally preceding the stages of the fertilization. The incubator 50 can be designed to maintain a temperature inside the incubator 50, where the oocytes are received for incubation, between 35 and 39 degrees Celsius. In a particular embodiment, the temperature inside the incubator 50 is maintained at 38.5 degrees Celsius. The incubator 50 can also be used to preheat fluids, e.g. the flushing fluid and/or the suction fluid.

Figure 5:
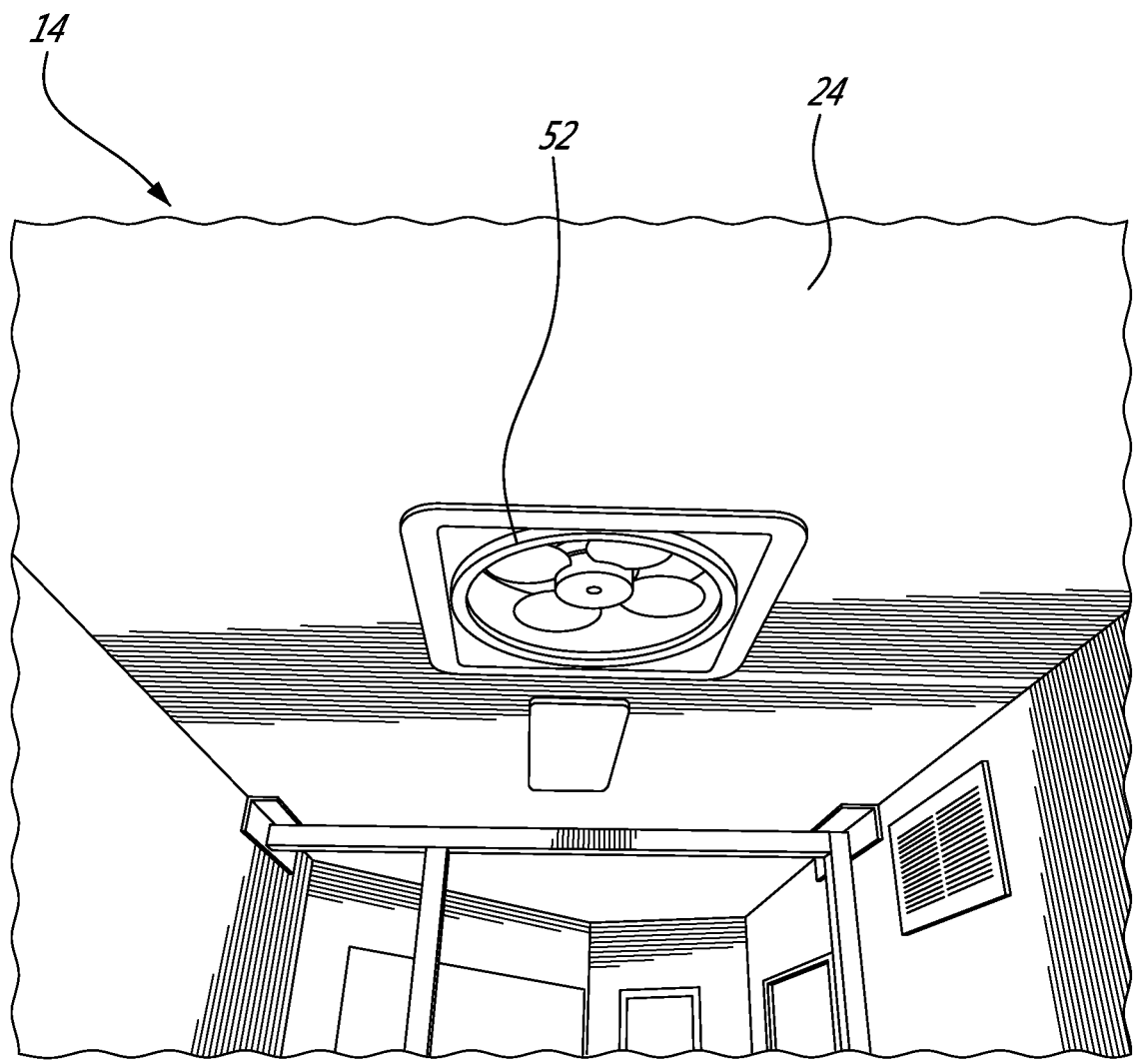
FIG. 5 is a partial perspective view of ventilator disposed in the collecting chamber.

The mobile unit 10 provides a controlled environment to minimize contaminating the oocytes during their manipulation and processing. For example, the chambers 14 and 16 can be sealed from each other to minimize exchange of gases between the two chambers 14, 16. In operation, the collecting chamber 14 can contain a non-negligible amount of methane which can be released from the animal. During the collection process of the oocytes, the animal can burp and release gases such as methane. Other harmful gases to the oocytes can also be present in the collecting chamber 14 particularly and/or surrounding the processing chamber 16 generally. These gases can affect the quality of the oocytes if they come into contact with the oocytes. Consequently, the processing chamber 16 is sealed from the collecting chamber 14 to reduce the transfer of gases from the collecting chamber 14 to the processing chamber 16. The processing chamber 16 can also be sealed from its surrounding environment. The collecting chamber 14 can include a ventilator 52 (FIG. 5) defined through the ceiling 24 to expel foul air containing the methane from the collecting chamber 14 to the exterior of the enclosure. For example, the ventilator 52 can be a fan.

Referring back to FIG. 2, the mobile unit 10 includes a temperature control unit 54 to control the temperature of the retrieved oocytes. A sudden increase or decrease of the temperature of the oocytes can cause a thermal shock and consequently damage or decrease the quality of the oocytes. The temperature control unit 54 can include the test tube heater mentioned above. The temperature control unit 54 can also include an air heating and/or cooling unit to control the temperature inside the collecting chamber 14, the processing chamber 16 or both. The air temperature inside the chambers 14 and 16 can be controlled between 20 and 40 degrees Celsius. In a particular embodiment, the temperature control unit 54 control the air temperature inside the chambers 14 and 16 between 24 and 26 degrees Celsius. Each chamber 14 or 16 can include its own independent temperature control unit.

The enclosure 12 can include an inter-chamber 56 between the collecting chamber 14 and the processing chamber 16. The inter-chamber 56 provides an intermediate space between the collecting chamber 14 and the processing chamber 16. In a particular embodiment, the inter-chamber 56 has two doors 58. Each door 58 respectively provides access from the inter-chamber 56 to a respective one of the chambers 14, 16.

For example, a technician going from the collecting chamber 14 to the processing chamber 16 can pass through the inter-chamber 56 while keeping one door 58 closed at all time to reduce air contamination between the two chambers 14, 16. The inter-chamber 56 can also provide a cleaning facility to remove any contaminants or dirt from the technician and/or equipment before entering the processing chamber 16. Of course, a passage through the exterior of the enclosure 12 from the collecting chamber 14 to the processing chamber 16 is within the scope of the present disclosure.

An access passage 60 can be provided between the collecting chamber 14 and the processing chamber 16 to transfer the oocytes between the two chambers 14, 16. The access passage 60 can be any connection allowing communication between the two chambers 14, 16 in an open position and insulating the two chambers 14, 16 in a closed position. Referring to FIG. 3, the access passage 60 is shown as a cleanroom pass-through or a transfer passage defined through the dividing wall 48 between two openings. The access passage 60 is also known as "pass-through air locks" and "transfer hatches". The pass-through has two opposite closable doors. Each door is disposed in one of the openings on an interior wall surface of a corresponding chamber 14, 16. The pass-through can block the air or gas flow in-between the chambers 14 and 16 and can be designed to be completely airtight to minimize contamination between the chambers 14, 16.

Figure 6:
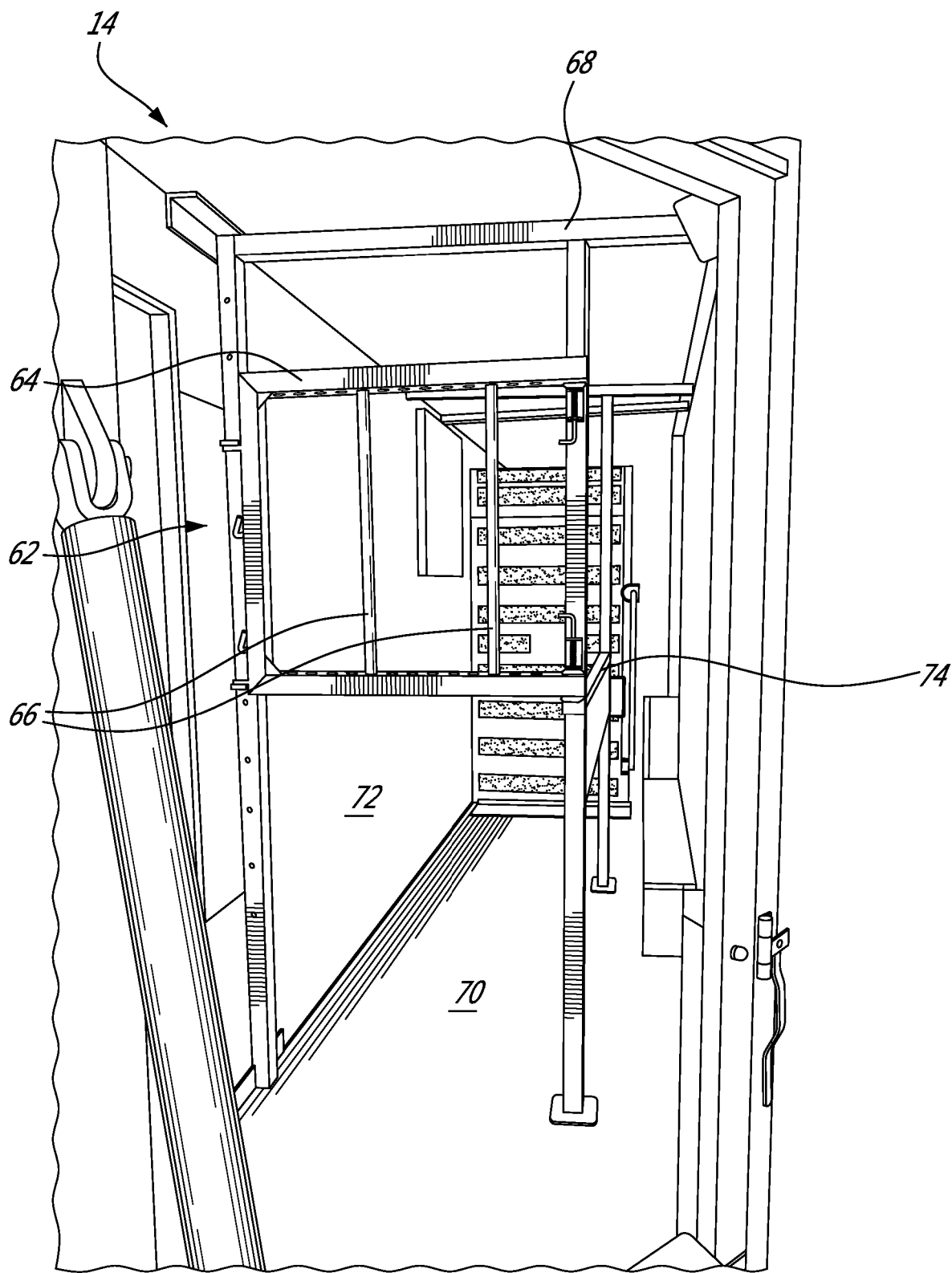
FIG. 6 is a front perspective view of the collecting chamber showing a restraint.

Referring to FIG. 6, the mobile unit 10 includes a restraint 62 mounted to the enclosure 12 within the collecting chamber 14. The restraint 62 is configured to hold the animal in a standing position. The term "restraint" is intended to include any device useful to control the animal from a short distance, such as a leash, harness, collar or other devices. In the embodiment shown, the restraint 62 includes a head confinement 64. The head confinement 64 retains a head of the animal in a specific position and/or location. In a particular embodiment, the head confinement 64 includes adjustable neckbars 66 to hold the head of the animal between two adjacent neckbars 66. The neckbars 66 are displaceable to adjust to a width of a neck of the animal. The restraint 62 can also include a frame 68 that defines a space 70 between an inner surface 72 of the sidewall of the enclosure 12 and a sidebar 74 or body to retain the body of the animal in the standing position between the inner surface and the sidebar 74.

Figure 7:
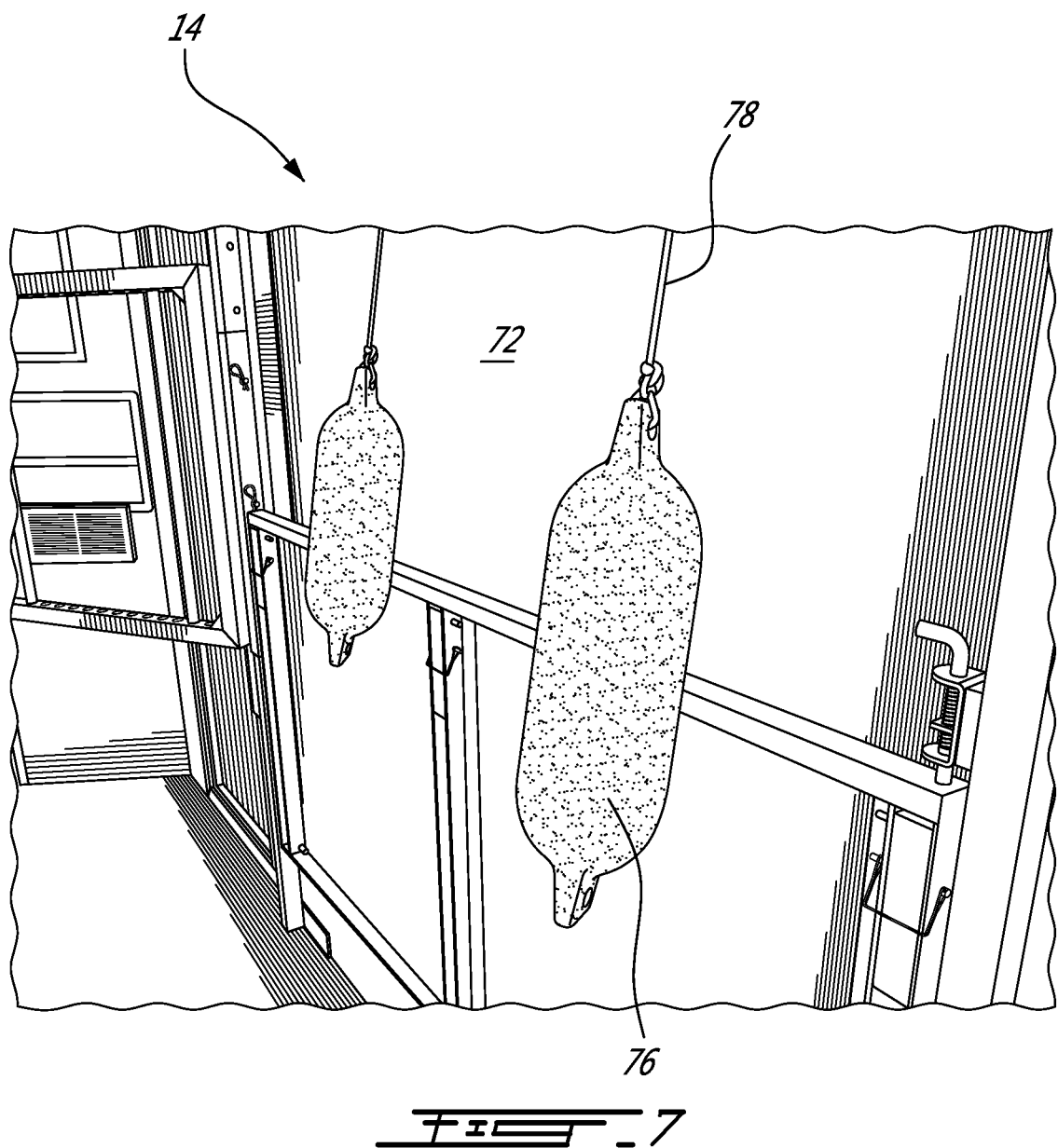
FIG. 7 is a partial perspective view of the restraint.

Referring to FIG. 7, one or more cushions 76 or inflatable balloons can be mounted on the inner surface 72 of the sidewall 28 located within the frame 68 to space the animal away from the inner surface 72. In the embodiment shown, two cushions 76 are mounted on ropes 78 and are thus movable within the space 70 defined by the frame 68. In a particular embodiment, the sidebar 74 can be mounted onto a jack to adjust the position of the animal between the sidebar 74 and the cushions 76.

Figure 8:
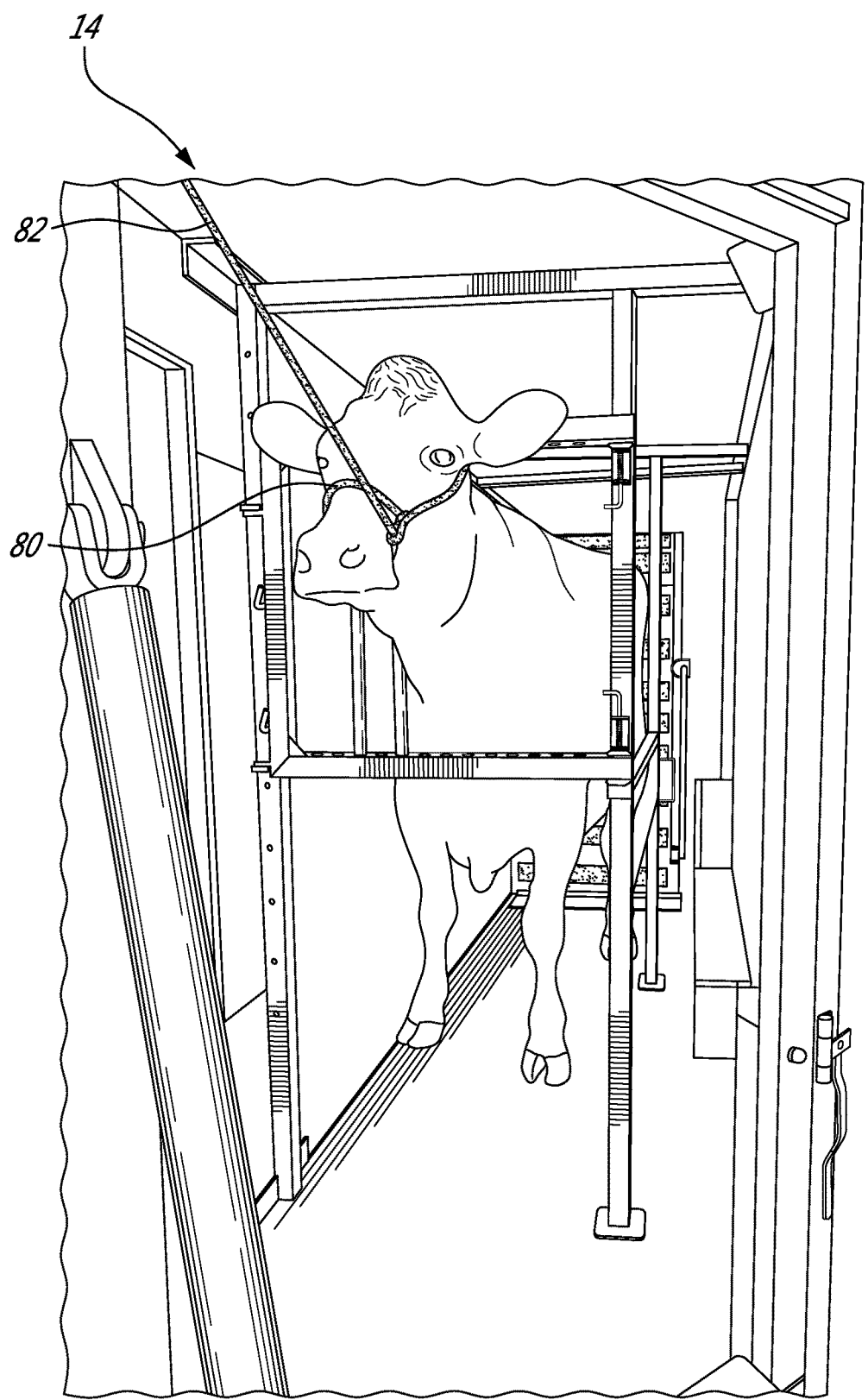
FIG. 8 shows an animal restrained by the restraint of FIG. 6.

Referring to FIG. 8, the restraint 62 includes a harness 80 with a rope 82 that has an adjustable length. The harness 80 can thus be carried away from the frame 68 to attach the animal and to pull the animal into the collecting chamber 14. For example, the harness 80 can be used to pull the animal from a distance outside the enclosure 12 into the collecting chamber 14.

Figure 9:
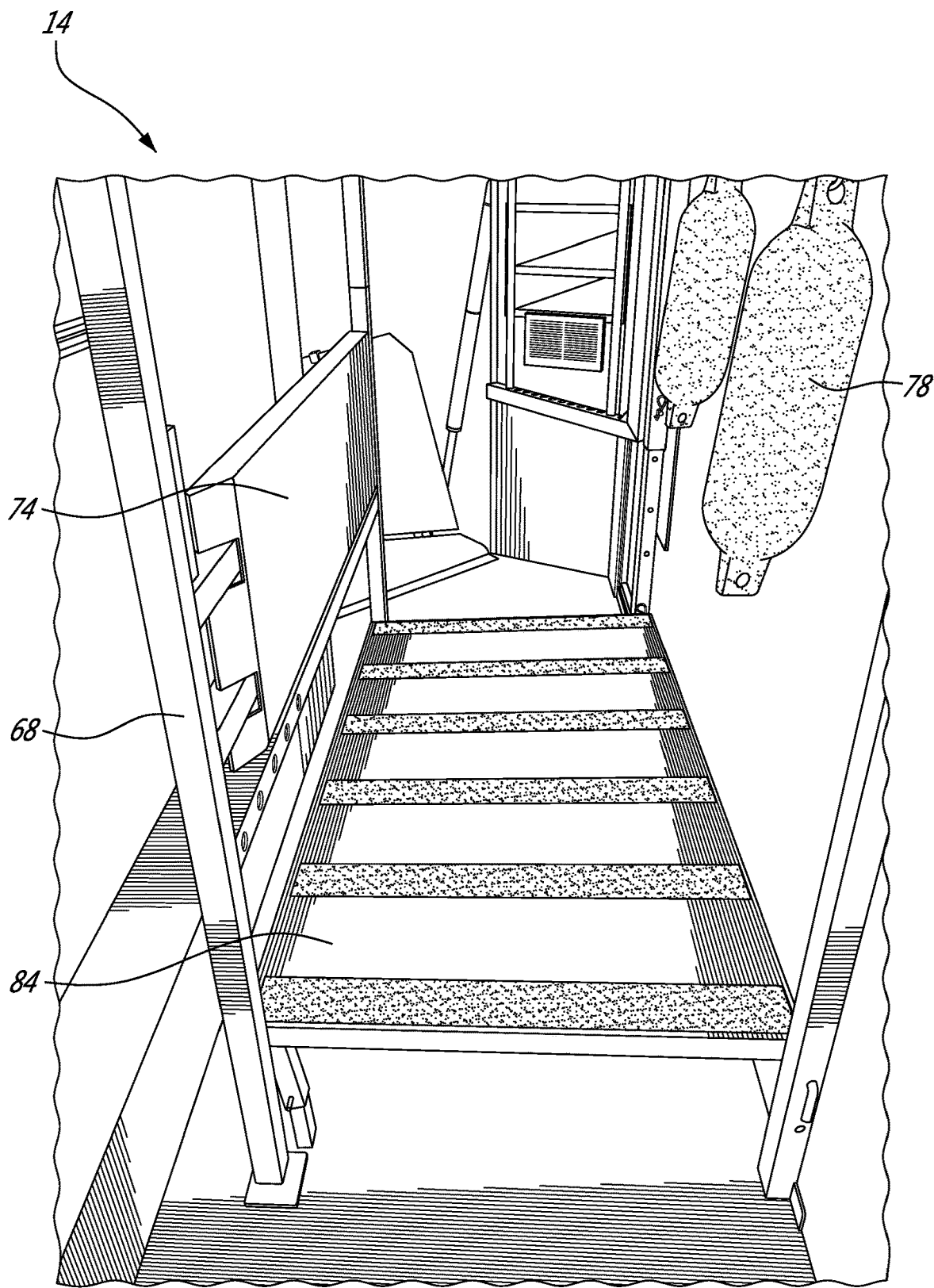
FIG. 9 is a perspective view of a platform to raise the animal within the collecting chamber.

Referring to FIG. 9, a platform 84 elevated from a surface of the floor 26 of the collecting chamber 14 can be installed within the space 70 defined by the frame 68. The elevation of the platform 84 can be adjusted to raise the animal to a desired height relative to the floor surface.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A mobile unit for animal ovarian tissue processing, the mobile unit comprising:
   an enclosure supported on at least one wheeled chassis;
   a collecting chamber defined within the enclosure, the collecting chamber comprising:
   a restraint mounted to the enclosure and configured to restrain and hold an animal in a standing position within the collecting chamber;
   at least one access sized to provide the animal ingress to, and egress from, the collecting chamber;
   an ovum aspiration system disposed in the collecting chamber to retrieve oocytes from the animal; and
   an imaging scanner disposed in the collecting chamber to guide the ovum aspiration system to the oocytes;
   a processing chamber including an incubator to incubate the oocytes on-site; and a temperature control unit operable in at least a heating setting to maintain a temperature of the retrieved oocytes between a predetermined temperature range.

2. The mobile unit as defined in claim 1, wherein the processing chamber is separated from the collection chamber by at least one partition wall compartmentalizing the enclosure, and wherein the enclosure further comprises an access passage between the collecting chamber and the processing chamber, the access passage operable between an open position and a closed position, the access passage providing an entrance to the processing chamber from the collecting chamber in the open position and insulating the processing chamber from the collecting chamber in the closed position.

3. The mobile unit as defined in claim 2, wherein the access passage includes a cleanroom pass-through defined through the at least one partition wall between two opposite openings, each one of the two openings is defined on an interior surface of a respective one of the collecting chamber and the processing chamber, a closable door is disposed in each one of the two openings.

4. The mobile unit as defined in claim 1, wherein the restraint includes a head confinement to restrainably retain a head of the animal therein.

5. The mobile unit as defined in claim 4, wherein the head confinement includes adjustable neckbars to hold the head of the animal therebetween.

6. The mobile unit as defined in claim 1, wherein the at least one access includes a first opening at one end of the collecting chamber and an opposite second opening at another end of the collecting chamber, the first and second openings configured to permit ingress and egress of the animal relative to the collecting chamber.

7. The mobile unit as defined in claim 1, wherein the temperature control unit maintains the temperature of at least one of the collecting chamber and the processing chamber between 20 and 40 degree Celsius.

8. The mobile unit as defined in claim 1, wherein the collecting chamber includes a ventilator to expel foul air from the collecting chamber to an exterior of the enclosure through the ventilator.

9. The mobile unit as defined in claim 1, wherein a flow rate of aspiration of the aspiration system is controlled between 10 and 20 millilitres per minute.

10. The mobile unit as defined in claim 1, wherein the restraint includes a space defined within a frame to receive a body of the animal between an inner surface of a sidewall and at least one side body to restrainably retain a body of the animal in the standing position.

11. The mobile unit as defined in claim 1, wherein the restraint includes a harness formed with a length of rope to pull the animal from a distance outside of the enclosure into the collecting chamber.

12. The mobile unit as defined in claim 1, comprising at least one cushion mounted on an interior wall surface of the collecting chamber within a frame of the restraint to space the animal away from the interior wall surface.

13. The mobile unit as defined in claim 1, comprising a foldable platform displaceable from a stowed position to an operation position in which the platform is elevated from a floor surface of the collecting chamber to raise the animal relative to the floor surface.

14. The mobile unit as defined in claim 1, wherein the temperature control unit includes a first temperature control unit disposed in the collecting chamber and a second temperature control unit disposed in the processing chamber, the first and second temperature control units being operable independently from each other.

15. The mobile unit as defined in claim 1, comprising a rail supporting the imaging scanner to displace the imaging scanner within the collecting chamber from one side of the collecting chamber to another.

16. The mobile unit as defined in claim 1, comprising an inter-chamber between the collecting chamber and the processing chamber, the inter-chamber includes two doors to respectively access the collecting chamber and the processing chamber.

17. The mobile unit as defined in claim 1, comprising at least one movable stabilizer mounted to the chassis and operable for engagement with a ground surface to stabilize the chassis relative to the ground surface.

18. The mobile unit as defined in claim 1, wherein the collecting chamber is enclosed by at least a ceiling and side walls to provide a dark interior of the collecting chamber.

19. The mobile unit as defined in claim 1, wherein the ovum aspiration system comprises a collecting tube to receive the oocytes from the animal into the collecting tube.

20. The mobile unit as defined in claim 1, wherein the predetermined temperature range is between 35 and 41 degrees Celsius.

21. The mobile unit as defined in claim 1, wherein the temperature control unit includes a collecting tube heater mounted to a collecting tube and in heat transfer relationship with the collecting tube.

22. The mobile unit as defined in claim 1, wherein the temperature control unit is operable in a cooling setting.

23. The mobile unit as defined in claim 1, wherein the at least one wheeled chassis comprises first and second wheeled chassis, and wherein the collecting chamber is supported on the first wheeled chassis and the processing chamber is supported on the second wheeled chassis proximate the first wheeled chassis.

24. A mobile unit for animal ovum pick up, the mobile unit comprising:
a wheeled chassis including an enclosure for on-site collection;
the enclosure compartmentalized into at least a collecting chamber and a processing chamber;
the collecting chamber having at least one access to permit ingress and egress of an animal and equipped with a restraint configured to restrain and hold the animal in a standing position within the collecting chamber, a vacuum pump disposed in the collecting chamber to retrieve oocytes from the animal, an imaging scanner disposed in the collecting chamber to guide a veterinarian during the oocyte aspiration procedure, and a system for adjusting a suction flow of the vacuum pump;
the processing chamber equipped with an incubator to incubate the oocytes retrieved in the collecting chamber; and
a temperature control unit operable to maintain a temperature of the retrieved oocytes between a predetermined temperature range.

25. A mobile unit for animal ovum pick up, the mobile unit comprising:
a wheeled chassis including an enclosure defining a collecting chamber having at least one access to permit ingress and egress of an animal, the collecting chamber equipped with a restraint configured to restrain and hold the animal in a standing position within the collecting chamber, an ovum aspiration system disposed in the collecting chamber to retrieve oocytes from the animal, an imaging scanner disposed in the collecting chamber to guide the ovum aspiration system to the oocytes, a processing chamber equipped with an incubator to incubate the oocytes retrieved in the collecting chamber; and a temperature control unit operable to maintain a temperature of the retrieved oocytes between a predetermined temperature range.

* * * * *